United States Patent [19]
Sodeikat

[11] Patent Number: 4,793,199
[45] Date of Patent: Dec. 27, 1988

[54] ELECTROMAGNETIC PRECISION ROTARY DRIVE

[75] Inventor: Dieter Sodeikat, Baierbrunn, Fed. Rep. of Germany

[73] Assignee: Messerschmitt-Bölkow-Blohm GmbH, Munich, Fed. Rep. of Germany

[21] Appl. No.: 941,397

[22] Filed: Dec. 15, 1986

[30] Foreign Application Priority Data

Dec. 19, 1985 [DE] Fed. Rep. of Germany ....... 3544930

[51] Int. Cl.$^4$ ............................................. F16H 27/02
[52] U.S. Cl. ...................................... 74/141.5; 74/142
[58] Field of Search ................ 74/141.5, 142; 310/21, 310/22

[56] References Cited

U.S. PATENT DOCUMENTS

| | | | |
|---|---|---|---|
| 1,381,514 | 6/1921 | Soper et al. | 310/21 |
| 2,271,968 | 2/1942 | Creager | 210/21 |
| 3,057,147 | 10/1962 | Hetzel | 210/21 X |
| 3,204,133 | 8/1965 | Tschudin | 310/22 |
| 3,518,464 | 6/1970 | Kawakami et al. | 310/21 |
| 3,519,856 | 7/1970 | Clifford | 310/22 |
| 3,532,912 | 10/1970 | Clifford | 310/21 |
| 3,581,128 | 5/1971 | Meisner | 310/21 |
| 3,678,307 | 7/1972 | Clifford | 310/22 |
| 3,694,681 | 9/1972 | Horstmann et al. | 310/21 X |
| 3,727,396 | 4/1973 | Hetzel | 310/21 X |
| 3,864,586 | 2/1975 | Saito | 310/21 |
| 4,056,743 | 11/1977 | Clifford et al. | 310/21 |

FOREIGN PATENT DOCUMENTS

| | | | |
|---|---|---|---|
| 1182732 | 12/1964 | Fed. Rep. of Germany | 310/21 |
| 815513 | 7/1937 | France | 310/21 |
| 1529163 | 5/1968 | France | 310/22 |
| 516299 | 12/1939 | United Kingdom | 310/21 |

Primary Examiner—Gary L. Smith
Assistant Examiner—Rodney M. Lindsey
Attorney, Agent, or Firm—Kenyon & Kenyon

[57] ABSTRACT

An electromagnetic precision rotary drive for a disk-shaped rotor. Along a peripheral annular zone of the rotor an armature band with a periodical pattern is disposed, which, within each period, varies continuously between the inner and the outer edge of the annular zone. The rotor is surrounded by a magent support, which carries at least one permanent magnet. If the magnet support is moved back and forth substantially radially, a torque is exerted on the rotor due to the interaction between the permanent magnet and the armature band.

6 Claims, 2 Drawing Sheets

ELECTROMAGNETIC PRECISION ROTARY DRIVE

BACKGROUND OF THE INVENTION

The present invention relates to electromechanical precision rotary drives.

Such electromagnetic precision rotary drives are needed, e.g., for measuring wheels which are equipped with optical components. The measuring wheels are often used in evacuated cryostats. The measuring wheel is driven by a rotor, which forms part of the electromagnetic rotary drive. The rotor may itself be the measuring wheel.

For such precision rotary drives operated in fixed uniform steps, stringent requirements are set in several respects.

Thus, the angle step width must be very accurately reproducible. Normal anticipated values are below 10 um, referred to the outside radius of the measuring wheel.

The measuring wheel and the optical components fastened thereon must not vibrate excessively either when the rotary drive starts up or when it stops. Even slight vibrations may lead to inaccuracies in the measurement results or to unnecessary delays.

If a precision drive is used, as described above, inside a cryostat, the number of electrical connections needed for the operation of the rotary drive must be minimized. Normally only two connecting wires, or in the case of a redundant drive three connecting wires, are available. Due to this limitation, precise multi-phase step drives, for example, cannot be employed.

Furthermore, in the precision rotary drive the power consumption per angle step executed should be low; thus, no closed-circuit power should be consumed in the set and maintained position of the measuring wheel.

Also, the rotary drive is to operate in vacuum as well as under air pressure in a wide temperature range between about 4K and 300K. It is to be possible to establish a thermal contact in the respective maintained measuring wheel position, in order, for instance, to maintain a desired temperature constant or to vary it in a defined manner.

SUMMARY OF THE INVENTION

It is an object of the present invention to provide an electromagnetic precision rotary drive whose design and operation are simple and which fulfills the above requirements.

The above and other objects of the present invention are achieved by an electromagnetic precision rotary drive, in particular, a step drive, for a rotor, comprising an armature which is formed as a closed armature band disposed in an outer flat annular zone of the rotor having a pattern periodical in a direction of rotation of the rotor which descends within each period from a radially outer edge of the annular zone toward a radially inner edge and thence ascends again toward the outer edge, a magnet support for at least one permanent magnet which forms part of a C-shaped magnet circle surrounding the edge of the rotor having an air gap receiving the armature band, and drive means for providing reciprocating movement to the magnet support in a substantially radial direction with respect to the rotor with at least an amplitude corresponding to the width of the armature band.

For the rotation of the rotor there is utilized in the rotary drive according to the invention the interaction between an armature band with a periodical pattern disposed on the rotor and a substantially radially reciprocating permanent magnet or permanent magnet arrangement. The matching of the periodical pattern of the armature band to the radial reciprocating motion of the magnet support for the permanent magnet makes possible a precise rotation of the rotor and a precise stopping in a fixed angular position without vibrations. Preferably the periodical pattern of the armature bank is composed within each period of two contiguous straight lines. In the respective holding position of the rotor an additional magnet coupling may be provided b a holding armature separate from the armature band between the latter and the permanent magnet on the magnet support.

Since with a uniform armature band the rotor can rotate out of the holding position in both directions, a provision must be made for a preferential direction. This preferential direction can be obtained by position-dependent magnetic coupling between the armature band and the permanent magnet. For this several options are available, as for instance variation of the magnetic coupling by a position-dependent air gap, i.e. essentially by different thickness of the armature band, or variation of the magnetic coupling by position-dependent magnetic active surface, i.e. by a different width of the armature band. The last solution is simpler in terms of manufacture.

According to a preferred embodiment, the magnet support is arranged at one end of a lever of a two-sided lever pivotable in the rotor plane about a shaft. At the other lever arm, a preferably electrical drive for the radial reciprocating motion of the magnet support is provided. This two-armed lever can be supplemented by another lever arm which has at its end a mechanical stopping device for the rotor, as for instance a ball which drops into a notch at the circumference of the rotor in every resting position. This design is especially vibration-free and makes possible a very high accuracy of position.

BRIEF DESCRIPTION OF THE DRAWINGS

The invention will be explained in greater detail in the following detailed description, with reference to the drawings, in which.

DETAILED DESCRIPTION

Figure 1:
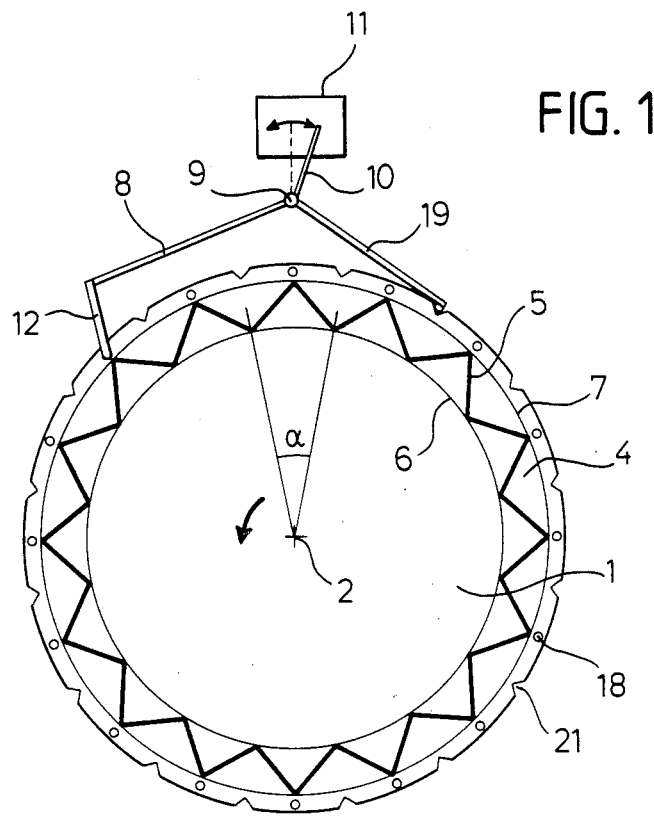
FIG. 1 is a schematic plan view of a precision rotary drive according to the invention, with a rotor, an armature band arranged thereon, and a magnet support for a permanent magnet arrangement, which support is actuated via a lever drive.
Figure 2:
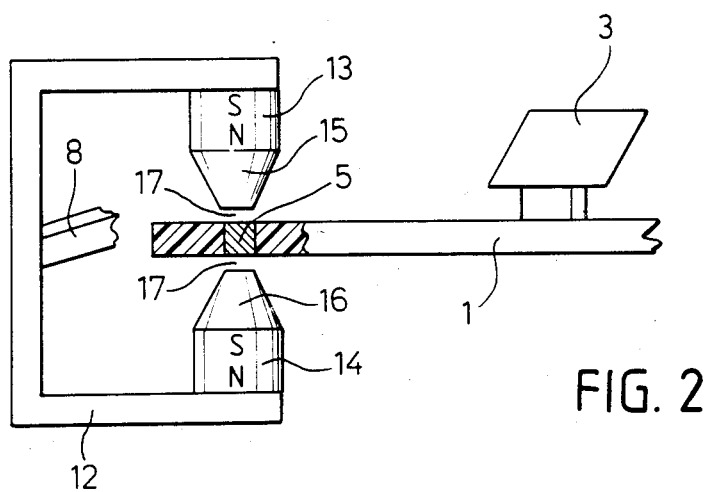
FIG. 2 is a partial transverse section through the rotor in the re of the magnet support.

In FIG. 1 is shown a rotor 1 of a precision rotary drive which can rotate about an axis 2 in fixed angle steps of an angle α each time. The rotor 1 serves as a measuring wheel and carries various optical elements; one optical element, here a mirror 3, is shown in FIG. 2.

Along the circumference of rotor 1 there extends in an annular zone 4 an armature band 5 in a periodical triangular pattern. The various straight lines of the armature band in this triangular pattern extend from an inner edge 6 to an outer edge 7 of the annular zone 4. Each triangle of the armature band 5 lies in a sector of angle α.

The armature band 5 is of soft iron, the rotor 1 of nonmagnetic material.

For the drive of rotor 1, a driving arm 8 is provided which pivots about a shaft 9. Connected with the driving arm beyond the shaft is a driven lever arm 10, which is coupled with a drive 11. By this drive 11, e.g. a bipolar electromagnet drive, the driving arm 8 is pivoted back and forth periodically.

At the end of the driving arm 8, a C-shaped magnet support 12 (FIG. 2) of magnetically conducting material is provided, on the C ends of which a permanent magnet 13,14 extending into the interior of the C is mounted. The C-shaped magnet support forms the magnetic flux return between the South pole of the permanent magnet 13 and the North pole of the permanent magnet 14. Connected with the permanent magnets 13 and 14 are frusto-conical pole pieces 15,16 which are directly opposite each other. In the air gap 17 between the pole pieces 15 and 16 runs the rotor 1, the armature band 5 lying directly between the pole pieces 15 and 16. Situated in the region of the outermost peaks of the triangular pattern of the armature band 5 are holding armatures 18, also made of soft iron, which have a cross section corresponding to that of the pole pieces 15 and 16. In the resting position of rotor 1 shown in FIG. 1, the pole pieces 15 and 16 are directly over such a holding armature 18. At the same time, the rotor 1 is stopped mechanically in this resting position. This occurs through a stopping arm 19, which is connected with the driving arm 8 and also pivots about the shaft 9. At the end of this stopping arm 19 a stopping cylinder 20 is mounted, which engages in one of several notches 21 on the circumference of rotor 1 and by the mechanical contact between stopping arm and rotor ensures an exact position of rotor 1. The notches 21 are arranged along the circumference of the rotor at regular intervals corresponding to the rotation steps of angle α.

Figure 3:
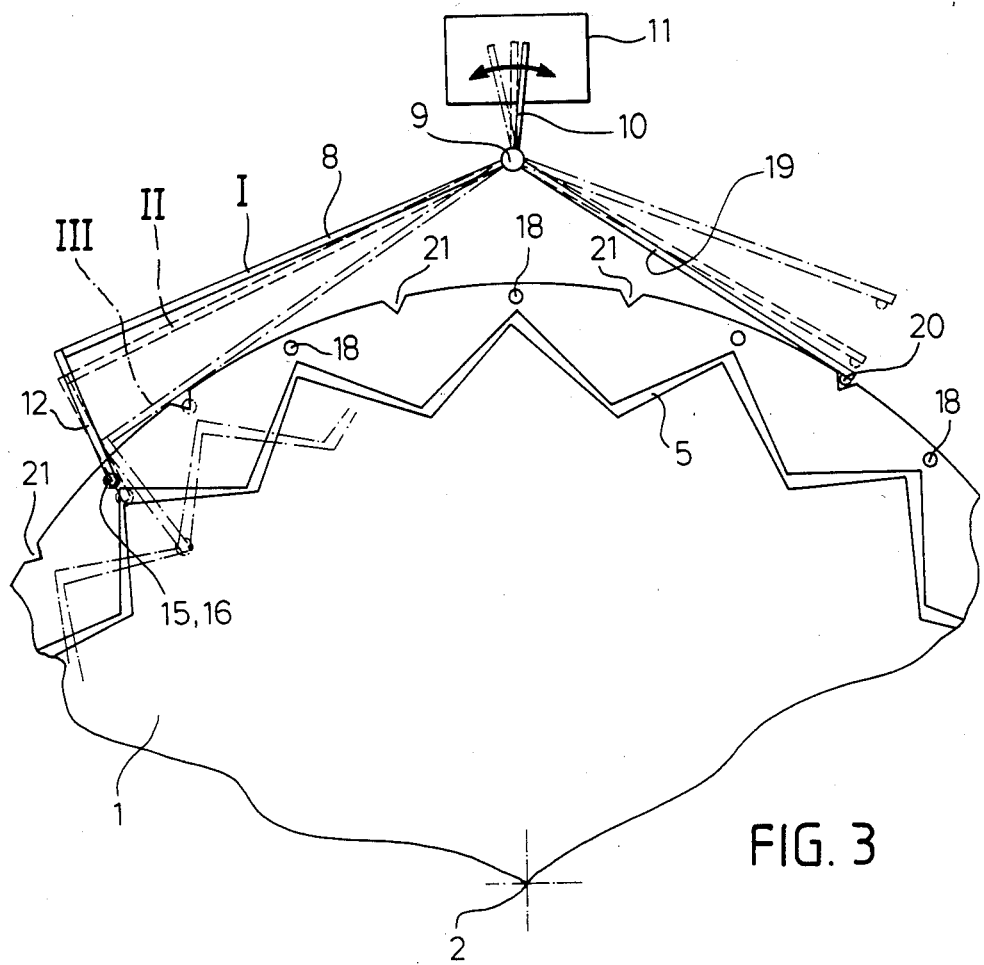
FIG. 3 is a partial view of the rotor and of the magnet support in different positions.

In the resting position shown in FIG. 1, therefore, the pole pieces 15 and 16 are directly over a holding armature 18; the stopping cylinder 20 engages in a notch (FIG. 3).

For the execution of a rotation step, drive 11 is turned on, so that the driven lever is moved to the left as shown in FIG. 1. Thereby the pole pieces 15 and 16 move substantially radially toward the tip of the periodical armature band pattern located at the upper edge 7 of the annular zone 4. At the same time the stopping cylinder 20 lifts out of notch 21, so that the rotor is released. When the pole pieces impinge on the armature band 5, the latter is attracted. During the further uniform movement of the driving arm 8 radially inward, the armature band is pulled always into the center of the two pole pieces 15 and 16. Through the angle of the armature band between the axial and tangential rotor axis there acts on the armature band and hence on the rotor a force with a tangential component by which the rotor 1 is rotated. The amplitude of the movement of the driving arm 8 is rated so that upon reversal of the driving arm the pole pieces 15 and 16 are directly above that point on the armature band 5 which lies on the inner edge 6 of the annular zone 4. At that time the angle of rotation is α/2. After reversal of the drive 11, from that time on the driving arm 8 moves radially outward, the armature band 5 being pulled along by the magnet coupling and hence also the entire rotor 1.

When the pole pieces 15 and 16 are directly on the point of the armature band which lies on the outer edge 7 of the annular zone 4, the stopping cylinder 20 stands directly above the next notch 21 and is pushed into this notch 21 with the onward movement of drive 11. At this time the pole pieces 15 and 16 are again directly opposite a holding armature. A rotation step of rotor 1 is thereby completed. The rotor is stopped mechanically and magnetically. Three positions of the driving arm and of the stopping arm are shown in FIG. 3. In position I the rotor is stopped magnetically and mechanically. In position II, shown in broken lines, the pole pieces 15,16 are directly at an outer tip of the armature band 5; the rotor is mechanically released. In position III, shown in dash-dot lines, the pole pieces are directly over an inner tip of tee armature band shown in dash-dot lines; between positions II and III the rotor was driven one-half a rotation step.

In another embodiment, the rotor 1 is driven continuously over a multiple of the angle of rotation. In that case the driving arm is moved back and forth periodically in such a way that its pole pieces 15 and 16 move between the inner and outer edges 6,7 of the annular zone 4. It is only when the rotor 1 is to be stopped that the driving arm 8 is moved radially outward to the extent that the pole pieces 15,16 go beyond the outer edge 7 of the annular zone 4 and come to stand directly opposite a holding armature 18. During the entire drive state over one or more rotation steps the stopping cylinder 20 does not touch the circumference of the rotor 1.

At the reversal points of the armature band 5 within the periodical pattern the rotor 1 could in principle rotate in both directions, if inertia is disregarded. In particular at the start of the rotary movement it cannot be predicted whether the rotor will turn to the left or to the right. To provide a defined direction, i.e. a preferential direction, the magnetic coupling between the armature band 5 and the pole pieces 15,16 is made dependent on position. To this end, according to FIG. 3, the width of the armature band 5 in the rotor plane is changed The armature band 5 is composed of individual straight but wedge-shaped branches, whose width decreases counter to the direction of rotation. The individual branches of the armature band extend between the inner and outer edges 6,7 of the annular zone 4; they are connected one to the other in such a way that a thin end of a wedge-shaped branch is connected with the thick end of the next following brace. Due to the resulting variation of the magnetic coupling between armature band and magnet support 12, the rotor rotates, on the whole, to the left as shown in FIG. 3. In addition to changing the width, the thickness of the armature band 5 (into the paper) can also be changed in like manner.

Figure 4:
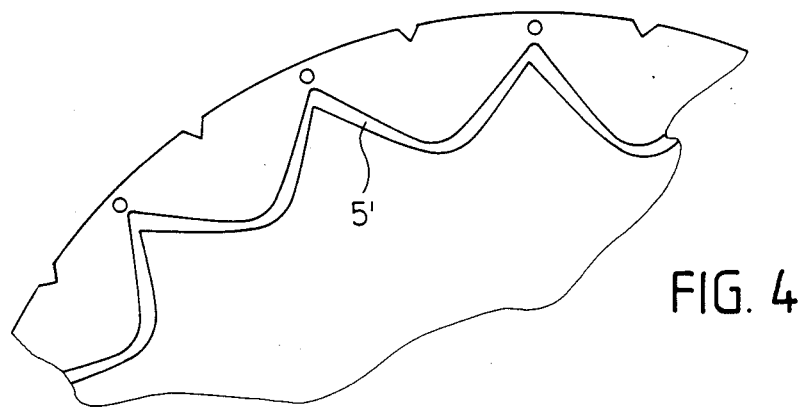
FIG. 4 is a partial view of a rotor with a modified armature band.

The timing of the rotational movement of rotor 1 can be influenced in several ways, as for instance by optimization of the current profile and of the electronic damping of drive 11 for the driving arm 8. In another embodiment, the course of the armature band is modified. In FIG. 4 is shown an ogive course 5' for the armature band. Also in this embodiment, the width of the armature band 5' is varied in the direction of rotation, to obtain a preferential direction of rotation of the rotor.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An electromagnetic precision rotary drive, in particular a step drive, for a rotor, comprising:

armature means comprising a closed armature band disposed in an outer flat annular zone of the rotor, having a pattern periodical in a direction of rotation of the rotor which descends within each period from a radially outer edge of the annular zone toward a radially inner edge and thence ascends again towards an outer edge;

magnet support means for at least one permanent magnet which forms part of a C-shaped magnet circle surrounding the edge of the rotor having an air gap for receiving the armature band, which support means is arranged at one end of driving arm means which is pivotable about a shaft by drive lever means, said driving arms means also being connected to a stopping arm means, which stopping arm means pivots about the same shaft as said support means and has at a free end thereof a mechanical stopping means for engaging the rotor;

said rotor being provided with notches on its circumference which engage with the mechanical stopping means at the end of the stopping arm means; and drive means for providing reciprocating movement to the magnet support means in a substantially radial direction with respect to the rotor with at least an amplitude corresponding to the width of the armature band.

2. The rotary drive recited in claim 1 wherein the periodical pattern of the armature band comprises within each period two contiguous straight lines.

3. The rotary drive recited in claim 1 wherein the width of the armature band changes at reversal points of the periodical pattern at the two edges in an always equal preferential direction in the drive direction.

4. The rotary drive recited in claim 1 wherein the thickness of the armature band changes at reversal points of the periodical pattern at the two edges in the drive direction in an always equal preferential direction.

5. The rotary drive recited in claim 1, wherein the permanent magnet comprises two permanent magnets, each having a pole piece fastened at each of the C ends of the magnet support means.

6. An electromagnetic precision rotary drive, in particular a step drive, for a rotor, comprising:

armature means comprising a closed armature band disposed in an outer flat annular zone of the rotor having a pattern periodical in a direction of rotation of the rotor which descends within each period from a radially outer edge of the annular zone toward a radially inner edge and thence ascends again toward the outer edge, one of either the width or thickness of the armature band changing at reversal points of the periodical pattern at the two edges in an always equal preferential direction in the drive direction;

magnet support means for at least one permanent magnet which forms part of a C-shaped magnet circle surrounding the edge of the rotor having an air gap for receiving the armature band; and drive means for providing reciprocating movement to the magnet support means in a substantially radial direction with respect to the rotor with at least an amplitude corresponding to the width of the armature band.

* * * * *